J. M. MOORE.
Cotton-Hoe.
No. 200,926. Patented March 5, 1878.
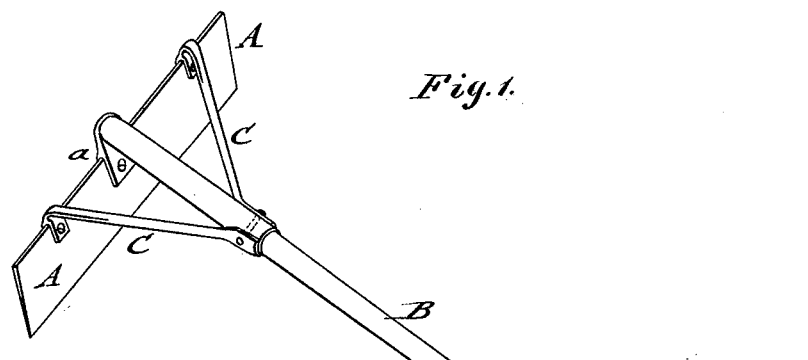
WITNESSES:
Henry N. Miller
C. Sedgwick
INVENTOR:
J. M. Moore
BY Munn & Co
ATTORNEYS.
N. PETERS, PHOTO-LITHOGRAPHER, WASHINGTON D C.

UNITED STATES PATENT OFFICE.

JOSEPH M. MOORE, OF OVILLA, TEXAS.

IMPROVEMENT IN COTTON-HOES.

Specification forming part of Letters Patent No. 200,926, dated March 5, 1878; application filed December 8, 1877.

*To all whom it may concern:*

Be it known that I, JOSEPH M. MOORE, of Ovilla, in the county of Ellis and State of Texas, have invented a new and Improved Cotton-Hoe, of which the following is a specification:

In the accompanying drawings, Figure 1 represents a perspective view of my improved cotton-hoe, and Fig. 2 a second smaller blade for garden use.

Similar letters of reference indicate corresponding parts.

The object of this invention is to furnish for farmers and cotton-raisers an improved hoe that can be used for chopping cotton, being made twice the length of the customary chopping-hoe, the hoe being also capable of use for garden purposes by changing the large blade to a small one.

The invention consists of a double blade for chopping cotton, that is screwed to a center brace and to detachable side braces, which are bolted to the handle. By removing the side braces and large blade a common blade for garden use may be screwed to the middle brace.

In the drawing, A represents a blade that is preferably of twice the usual length of hoes, about fifteen inches long, and about two inches wide from cutting-edge to back. The blade A is secured by screws to a middle brace or support, $a$, of the handle B, and also to side braces C, that are bolted to handle.

The blade A may be removed from the braces by unscrewing the fastening-screws and detaching the side braces. A common blade, D, may then be screwed to the middle brace, and thereby a garden-hoe obtained.

The long-bladed cotton-hoe is of so light construction that it can be quickly and easily worked, the blade passing easily through the earth, as it has no parts where the earth may stick.

The cotton is cut at one stroke for the entire width of fifteen inches, and saves the work of one hand, as the hoe accomplishes the double work.

The blade or knife is made smooth, thin, and sharp, so as to pass easily through earth and quickly chop out the young cotton to a perfect stand.

By removing the side braces and double-sized blade the smaller blade may be attached to the middle brace, and a complete garden-hoe obtained thereby, that may be used with the handle of the cotton-hoe throughout the year, until the time comes for attaching the cotton-chopping blade.

Having thus described my invention, I claim as new and desire to secure by Letters Patent—

The solid blade A, clamped between the split ends of braces C C, and looped support $a$, as shown and described, for the purpose specified.

JOSEPH MARTIAL MOORE.

Witnesses:
L. F. SMITH,
W. H. THOMAS.